United States Patent

[11] 3,557,753

| [72] | Inventor | Joseph L. Dantoni |
| | | Rte. 6, Westminister, Md. 21157 |
| [21] | Appl. No. | 783,451 |
| [22] | Filed | Nov. 13, 1968 |
| [45] | Patented | Jan. 26, 1971 |

[54] AQUATIC CHAMBER
8 Claims, 18 Drawing Figs.

[52] U.S. Cl. ............................................. 119/2, 119/5
[51] Int. Cl. ..................................... A01k 63/00, A01k 64/00
[50] Field of Search ................................. 119/2, 3, 5

[56] References Cited
UNITED STATES PATENTS

| 2,594,474 | 4/1952 | McGrath | 119/5 |
| 3,025,831 | 3/1962 | Berardi | 119/2 |
| 3,324,829 | 6/1967 | Dosamantes De Jose et al. | 119/5 |
| 3,371,789 | 3/1968 | Hense | 119/5X |
| 3,387,587 | 6/1968 | Kelley et al. | 119/2 |
| 3,465,718 | 9/1969 | Handman et al. | 119/2 |

*Primary Examiner*—Hugh R. Chamblee
*Attorneys*—J. Wesley Everett and George L. Brehm ABSTRACT: An aquarium having a tank for living aquatic specimens, the tank filled with aquatic media suitable for the specimens, a filter in the tank which has an uppermost layer of living algae and aquatic plants, an intermediate layer of calcite to precipitate acid compounds and maintain a suitable PH factor in the media and a lower layer of fiber wool containing anaerobic micro-organisms is provided. A means circulating the media through the aquarium and the three layers of filter, a heating and cooling means for the media and a lighting means complete the structure.

PATENTED JAN 26 1971 3,557,753

INVENTOR
JOSEPH L. DANTONI

BY: *J. Wesley Everett*
ATTORNEY
*George L. Brehm*
AGENT

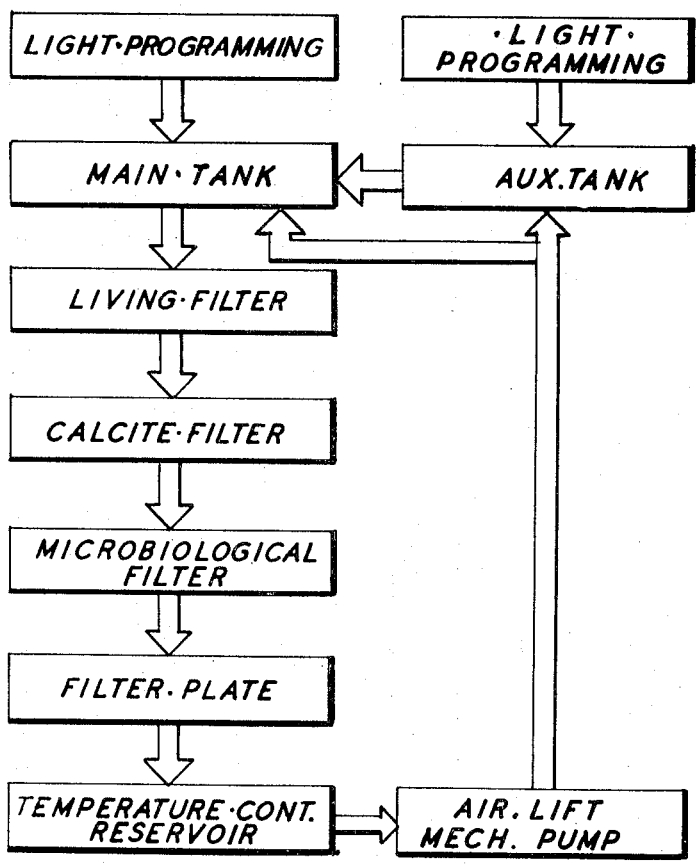
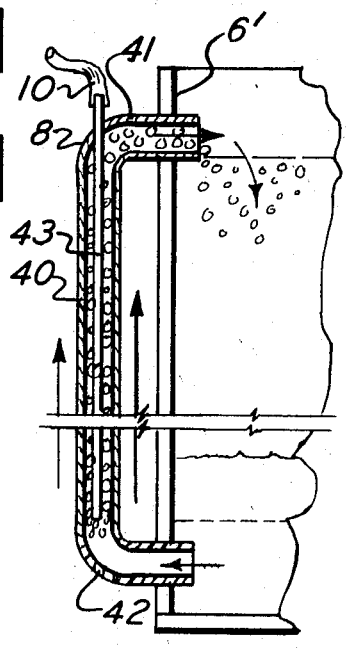
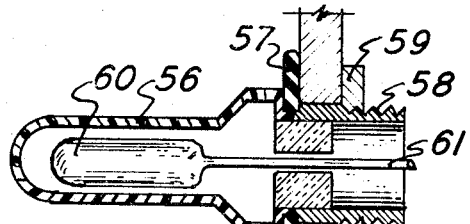
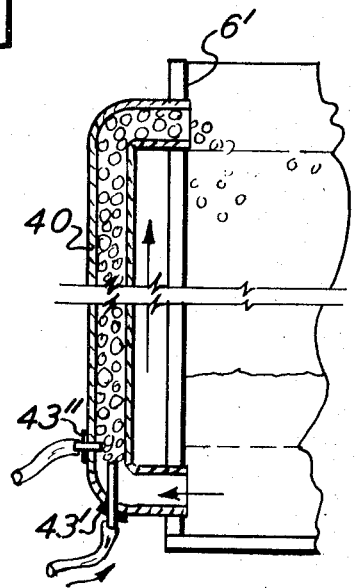
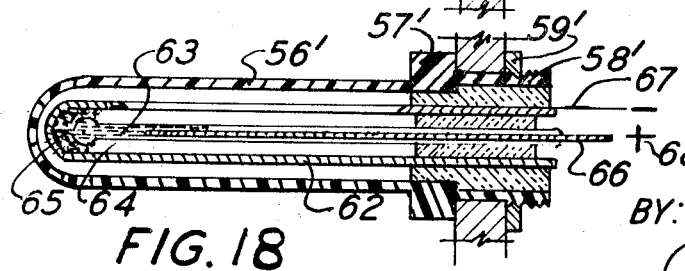

INVENTOR
JOSEPH L. DANTONI

AQUATIC CHAMBER

This invention relates to aquariums of the general type for use in research, teaching and exhibiting aquatic specimens. It is especially designed and adapted for use with salt or sea water specimens but may equally well be used for fresh water specimens by providing the proper brine solution or fresh water as the case may be.

Aquariums of various types have been known and sold on the market for many years but none have been found completely satisfactory by scientists or aquatic biologists because they all lack one or more of the elements of an environmental system closely approaching an ecosystem.

As is well known, all life is dependent upon energy from the sun. Plant life through photosynthesis converts environmental materials into chemical energy which energy is partly used by the plant itself in its life process or stored as sugar and starch. Plants on the other hand are directly consumed by animal life and additionally plants give off materials into the environment which are necessary to sustain animal life. Thus, in nature, biological reactions take place between plants and animals to form an ecosystem. Each is necessary to sustain the life of the other. Several typical reactions as are found in aquatic life are as follows:

1. Oxygen and Carbon Dioxide. These two substances stand in a reciprocal relationship to each other as regards the fundamental reaction of life. Plants utilize carbon dioxide in photosynthesis and release oxygen, whereas animals use oxygen in respiration and release carbon dioxide. A reciprocal relationship exists between plants and animals with each depending upon products from the other to maintain its existence.

2. Nitrogen Compounds. Organisms in a biologically balanced aquatic system both synthesize and break down nitrogen compounds to maintain a balanced system. Organic nitrogen, ammonia, nitrogen, nitrite, and nitrate compounds are involved in reciprocal reactions caused by plants, animals, and micro-organisms. Animals excrete urea which is decomposed by anaerobic micro-organisms to nitrogen compounds. These nitrogen compounds are taken from the sea media and utilized by plants in their life process. Plants in turn are utilized by animals and excreted as nitrogenous waste. A reciprocal process of nitrification and denitrification take place simultaneously in the system.

3. Organic Matter. Organic material is found in the system as an initial part of the sea media and as a result of the breakdown of plant and animal tissues. Anaerobic micro-organisms decompose organic materials to the basic inorganic compounds. These basic compounds are utilized by plants in their life process and plants in turn are utilized by animals. A relationship exists between micro-organisms, plants and animals as each takes part in a cycle utilizing the organic compounds. Many other reactions between plants, animals and micro-organisms take place in the system but for brevity will not be included in this discussion.

It is one object of the present invention to produce an aquarium which maintains an environment which is favorable to life support of the most delicate specimens, both plant and animal.

It is another object to produce an aquarium in which the various factors comprising the environment, such as light, temperature, etc. may be easily varied and controlled to best suit the particular specimens contained therein.

It is a still further object to produce an aquarium with an environmental system closely approaching an ecosystem.

Applicant accomplishes the above by providing an aquarium with three distinct filter areas; 1. a living filter of algae and grass whose function is photosynthesis in the system; 2. a calcite filter which functions as a pH buffer and an acid precipitant; and 3. a microbiological filter of synthetic fiber wool which functions to provide an environment for the growth and propagation of anaerobic micro-organisms. The anaerobic micro-organisms transform products of metabolism into useable materials that take part in photosynthesis.

In addition applicant provides a controllable light source, controllable heating and cooling means and a media circulating means which includes a means for bubbling off harmful gas products.

The above and other objects and advantages will become more apparent as this description proceeds and reference is had to the accompanying drawings forming a part of this specification in which like characters of reference refer to like parts and in which:

FIG. 5 is a flow chart of the system utilized in my invention;

FIGS. 6, 7 and 8 show several different air lift flow arrangements for aquarium tanks;

FIGS. 17 and 18 are sectional views of two types of immersion thermostats which may be used in the system.

Figure 1:
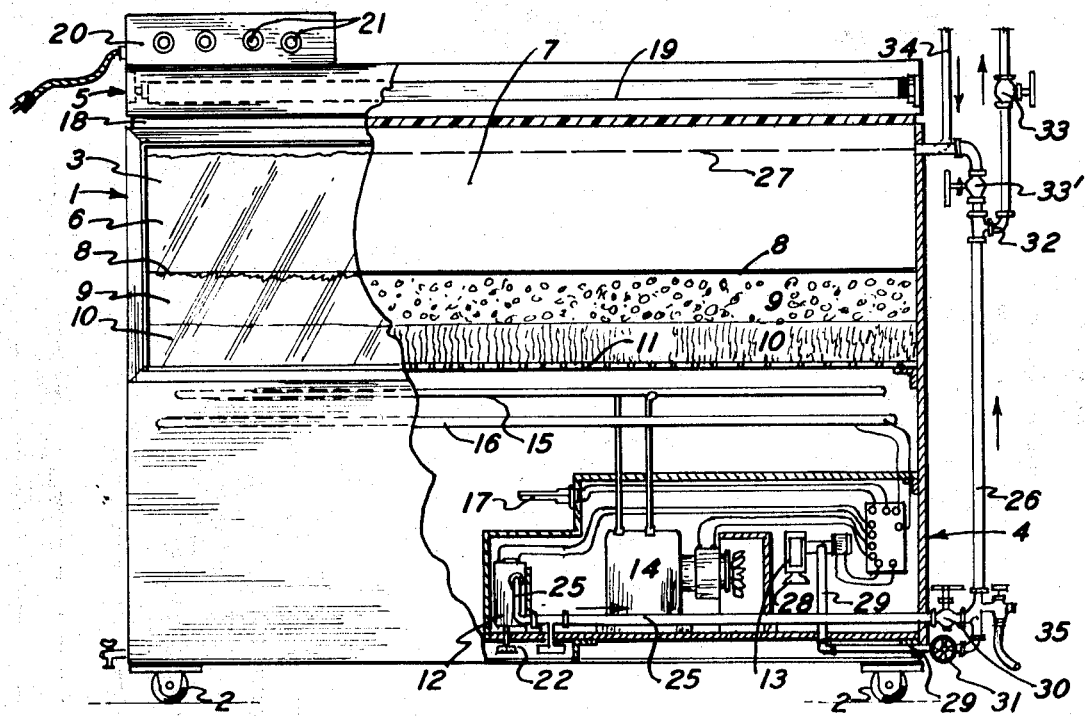
FIG. 1 is a side elevation, partly broken away and in section of an aquarium according to my invention.
Figures 2, 3, 4:
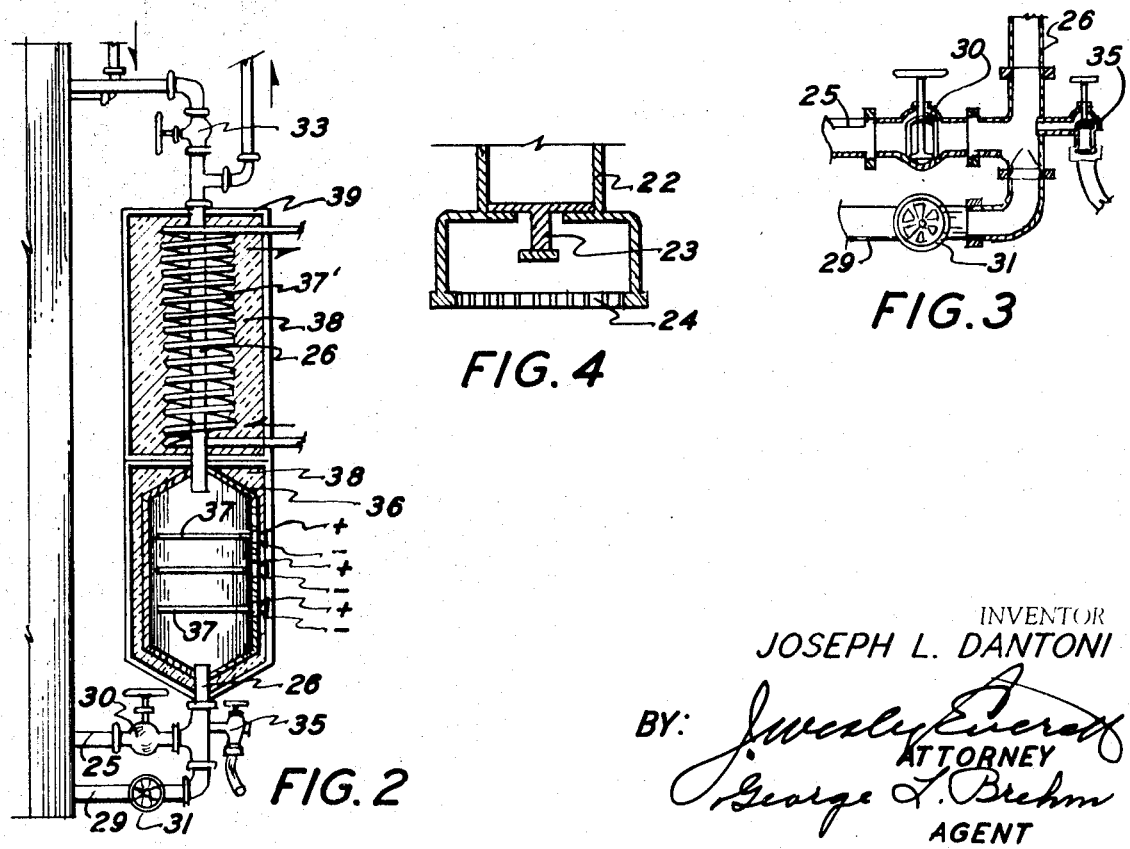
FIG. 2 is a sectional view through an alternative form of heating and cooling unit for use in the inlet line of a main or auxiliary tank.
FIG. 3 is an enlarged fragmentary view of the valve means between the mechanical pump, the air lift pump and the inlet line of the aquarium shown in FIG. 1.
FIG. 4 is an enlarged detail sectional view of the valved inlet from the reservoir to the mechanical pump.

Referring in more detail to the drawings and particularly to FIGS. 1, 2 and 4, reference numeral 1 indicates the entire unit which, for mobility, may be mounted on casters 2. The unit contains three main components, the tank for specimens 3, the utilities section 4 and the lighting section 5.

The tank 3 which is preferably enclosed in transparent sidewalls 6 is filled with the proper media 7 for the particular specimens to be contained therein. It is to be understood that this media may be fresh water or sea water, natural or synthetic, as required by the circumstances.

A filter system occupies the lower portion of the tank which system contains three separate filters, a "living" filter 8 comprising algae and plants, a calcite filter 9 to control the pH factor of the media and a third filter 10 of synthetic fiber wool for growth of anaerobic micro-organisms. These filters, their functions and their relationship with the other elements of the aquarium will be more fully discussed hereinafter.

The three filters are supported on a perforated plate 11 within the tank 3.

The utilities section 4, which is necessarily in a compartment sealed from the tank section, contains a mechanical pump 12, an air lift pump 13, a refrigeration unit 14 and the necessary electrical supply and controls as they require.

The evaporator 15 of the refrigeration system is immersed in the tank 3 below the perforated plate 11 as is an electrical heating element 16. These two elements function to maintain the proper preselected temperature of the media in the tank. It is obvious that any means which is the equivalent of the elements 15 and 16 such as, for instance, a system utilizing a reverse refrigeration type of heating and cooling method may be employed in lieu of elements 15 and 16 and their associated parts.

An immersion type thermostat 17 located in the media in the tank is used to control the heating and refrigeration systems to maintain a set temperature in the media.

The tank is covered with a top plate 18 of transparent material, preferably plastic and functions not only to keep foreign matter from the tank but to catch and return to the tank any condensate which may accumulate due to evaporation from the tank.

The lighting section 5 is located above the tank and comprises one or more lamp members 19 preferably of the elongated tubular type as shown, and a control unit 20 for the lamps having controls 21 for varying their brightness. Suitable timing mechanism (not shown) may also be incorporated in the control unit for turning the lamps on and off at preset times and for varying their intensity automatically to simulate dawn and dusk if such is desired.

The mechanical pump 12 has an intake pipe 22 provided with a one way valve 23 and a screen 24 (see FIG. 4). Its outlet pipe 25 extends outwardly through the casing and connects to the pipe 26 which carries the media from the tank up to the top of the aquarium where it discharges into the same at about the level 27 of the media therein.

The air lift pump 13 sucks in air at its intake 28 and its discharge pipe 29 is carried out and connected to the pipe 26 at the lower end thereof. This pump mixes air with the media being carried up through pipe 26 and aerates the same and assists in bubbling off harmful gases from the media.

Valves 30 and 31 in the pipes 25 and 29 respectively allow for regulation of the flow of media and air into the pipe 26.

A tapoff 32 may be provided in pipe 26 for supplying an auxiliary tank if desired and a valve 33 in the tapoff line is provided to regulate the flow to the auxiliary tank or close off the flow thereto as desired. Another valve 33' in the pipe 26 may also be employed for the same purpose. If an auxiliary tank is used its return line 34 is discharged into the main tank at media level 27 as shown.

A valve 35 may also be provided in the pipe 26 to serve as a drain.

As an alternative arrangement for the heating and cooling means of FIG. 1 above described, a heater and cooler may be located in the pipe 26 as shown in FIG. 2. In this arrangement a small tank or container 36 receives the media at its lower end from pipe 26 and may be heated therein by one or more electric immersion heaters 37. Above the heater tank 36 pipe 26 passes through a cooler coil or evaporator 37' of a refrigeration system. Both heater and cooler are well insulated both from each other and from the outer air by an insulating jacket 38 and outer casing 39.

The last described heater and cooler may be used in lieu of the heater and cooler used in FIG. 1 or it may be used with an auxiliary tank in conjunction with a main tank or alone as a separate entity.

Several mechanical air lift flow systems are shown in FIGS. 6, 7, 8 and 9 which may be used in lieu of the air lift system of FIG. 1 or in an auxiliary tank.

In FIG. 6 the tube 40 is positioned without the tank wall 6' and has turned in ends 41 and 42 extending through the tank wall, the upper end extending in at a level about the level of the media and the lower end extending in below the level of the filter. A smaller tube 43 extends through the wall of the tube 40 at the upper turned in end and extends concentrically within the tube 40 to near the bottom thereof. Air introduced into tube 43 will bubble up between tubes 40 and 43 and carry the media therewith and effect circulation through the system. It will also function to aerate and bubble off any harmful gases.

The form shown in FIG. 7 is similar, but in this instance the air tube 43' or 43'' is extended through the wall of tube 40 at the lower bent in portion and directed upwardly or radially through the wall respectively. Either arrangement will effectively cause bubbling up of the media in the tube 40 and effect circulation.

Figure 8:
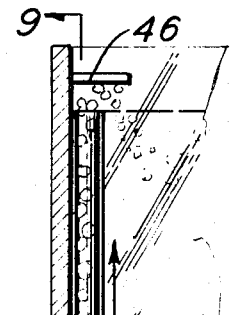
Figure 9:
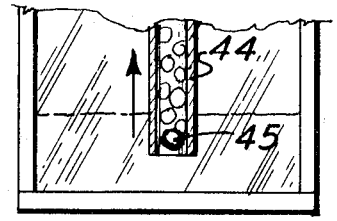
FIG. 9 is a sectional view taken on line 9—9 of FIG. 8.

In the form shown in FIGS. 8 and 9 a tube 44 is positioned within the tank adjacent the sidewall and extends from the level of media at its upper end to below the filter at its lower end. A small tube 45 through which air may be introduced extends through the sidewall of the tank and into the tube 44 near its lower end. A plate 46 above the upper end of the tube 44 will allow air laden media to condense on it and fall back into the tank.

Several types of auxiliary tanks are shown in FIGS. 10 to 16 inclusive which may be used as remote tanks and reservoirs and show inlet and drain lines in different arrangements. All other elements in these views are the same as previously described.

Figure 10:
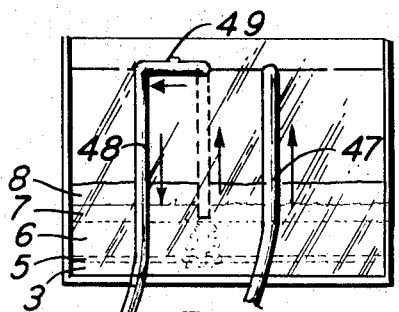
FIGS. 10 to 16 are sectional views of auxiliary tanks showing several arrangements of inlet and drain pipes.
Figure 11:
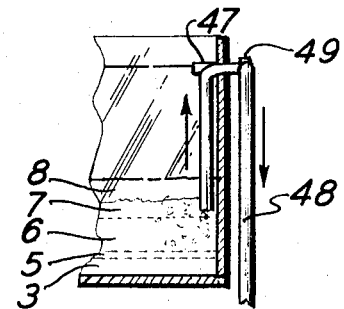

In the form shown in FIGS. 10 and 11 the inlet line 47 leads to substantially the level of the media in the tank and the outlet line 48 extends downwardly within the tank to substantially the bottom of the filter. The outlet line 48 is provided with a small opening 49 at its top portion to prevent any tendency to syphon.

Figure 12:
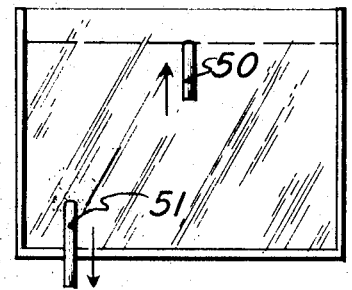
Figure 13:
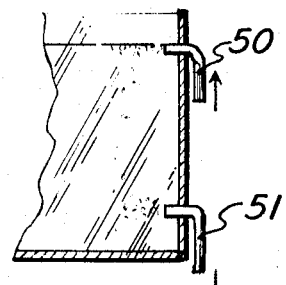

FIGS. 12 and 13 show the inlet line 50 at the top level of the media and the outlet 51 at a level below the filter.

Figure 14:
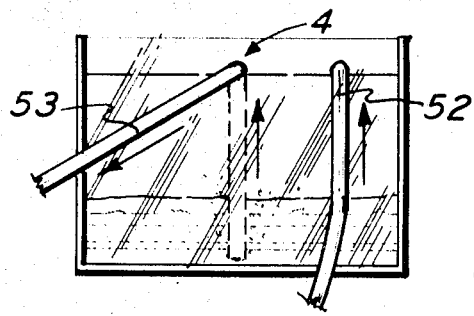
Figure 15:
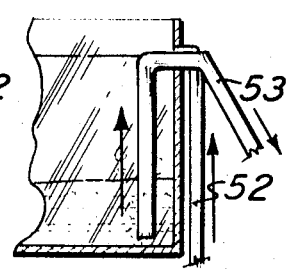

FIGS. 14 and 15 show an arrangement similar to FIGS. 10 and 11 with the inlet 52 at the level of the media and the outlet 53 below the level of the filter.

Figure 16:
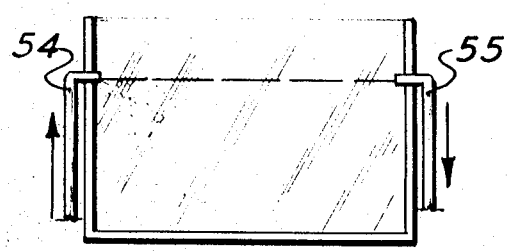

FIG. 16 shows both inlet 54 and outlet 55 at the level of the media in the tank.

FIG. 17 shows one type of immersion thermostat which may be employed as element 17 in FIG. 1 of the system. It comprises an outer casing 56 which at one end is provided with a flange 57 and a threaded extension 58. A nut 59 is threaded on the extension and serves to clamp the casing to opposite sides of the reservoir in a water tight seal. A bulb type temperature responsive element 60 connected to a tube 61 is mounted within the casing and the tube 61 in turn is connected to a pressure responsive switch (not shown) in the heating and cooling system to control the same.

In FIG. 18 a second type thermostat is shown. The casing with its mounting means 56', 57', 58' and 59' are similar to the corresponding elements 56, 57, 58 and 59 of FIG. 19. In this form the thermostat element within the casing is of the mercury column type. An inner electrically conductive casing 62 houses a mercury tube 63 of insulating material such as glass which in turn contains a quantity of mercury 64 in electrical contact with casing 62 at 65. A strip of resistance material 66 within the mercury tube extends along the column of mercury therein. It is evident as the temperature vanes the column of mercury will lengthen or shorten and leave less or more of the resistance strip exposed and thus vary the total resistance between the terminals 67 and 68. Obviously control means for the heating and cooling system responsive to this change in resistance must be employed.

The system functions as follows: the tank 3 receives the media from the inlet pipe 26, from thence it distributes throughout the tank. The media then passes through the living filter 8 of algae and plants where compounds are removed from the media and serve the life process thereof or are stored as sugar or starch.

From the living filter the media passes through the calcite filter which is composed of 90—92 percent calcium carbonate, 3—6 percent magnesium carbonate and the balance silica compounds. This filter functions as a pH buffer and to precipitate acid compounds as calcium salts. The action of the calcite filter brings the system into desirable pH balance of 7.6 to 8.3 depending on the sea salt used if the latter is a commercial synthetic product.

From the calcite filter the media passes down through the microbiological filter which is composed of closely packed mass of nontoxic synthetic fiber wool which provides an environment for the growth and propagation of anaerobic microorganisms. It is here that many of the products of metabolism are transformed by micro-organisms into usable materials that take part in photosynthesis.

From the last filter the media is subjected to the heating or cooling required and is then recirculated by the mechanical and air lift pumps to begin the cycle again.

During circulation of the media it is subjected to the rays of the lighting system which can be varied to suit requirements and/or to simulate daylight, dawn and dusk or to filter out certain light rays if conditions so require.

I claim:
1. An aquarium comprising:
   a tank for containing living aquatic specimens, said tank being filled with aquatic media suitable to said specimens;
   a filter in said tank, said filter having a topmost filter medium of algae and aquatic plants functioning by photosynthesis to remove from the aquatic media com- pounds which serve in the life process of the algae and plants or are stored therein as sugar or starch;

a second intermediate filter medium below said topmost filter, said second filter medium of calcite material;

a third filter medium of fiber wool below said intermediate filter medium;

means for circulating said aquatic media from below said third filter medium, through the circulating means and back to the tank above said topmost filter medium;

heating means for the aquatic media;

cooling means for the aquatic media; and lighting means positioned to direct the light rays thereof on said aquatic media.

2. An aquarium as defined in claim 1 in which said calcite filter comprises 90—92 percent calcium carbonate, 3—6 percent magnesium carbonate and the balance silica compounds, said filter acting as a pH buffer and to precipitate acid compounds as a calcium salt and to maintain the desirable pH balance of 7.6 to 8.3 in the aquatic media, and in which the fiber wool filter contains a growth of anaerobic micro-organisms which transform the products of metabolism into usable materials which take part in photosynthesis.

3. An aquarium as defined in claim 1 in which the circulating means includes an air lift pump for aerating the aquatic media and bubbling off harmful gases.

4. An aquarium as defined in claim 1 in which the heating and cooling means are immersed directly in the tank.

5. An aquarium as defined in claim 1 in which the heating and cooling means are enclosed in a container separate from the tank and the aquatic media from the tank is circulated therethrough and returned to the tank.

6. An aquarium as defined in claim 1 in which the lighting means is positioned above the tank and means is provided to vary the intensity of the light.

7. An aquarium as defined in claim 1 in which the aquatic media is taken from the tank for the circulating means at a point below the third filter and returned to the tank at the level of the media in the tank.

8. An aquarium as defined in claim 1 wherein one or more auxiliary tanks are associated with the primary filter tank for receiving a flow of aquatic media from the primary tank and means for returning the overflow of media to the primary tank.